United States Patent Office 2,844,519
Patented July 22, 1958

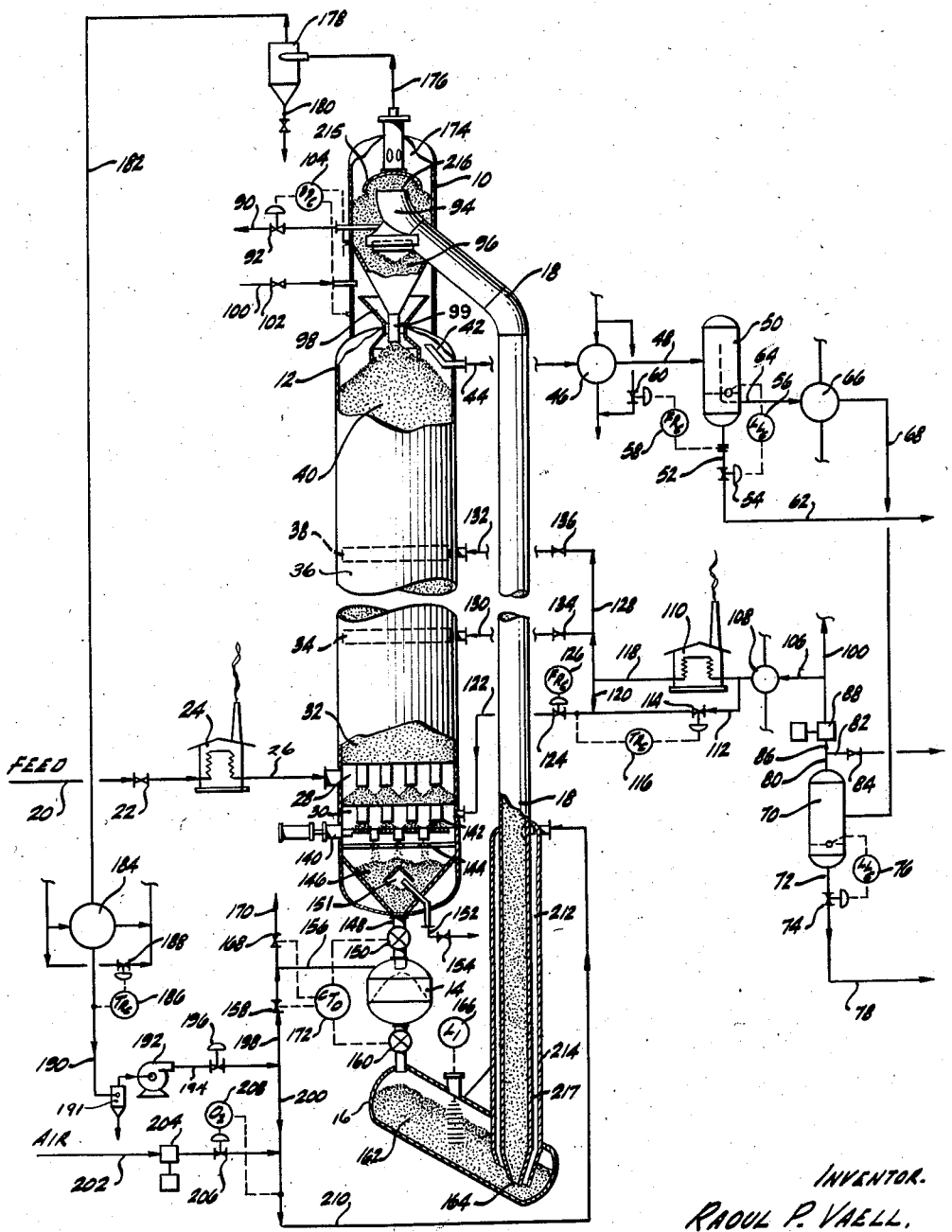

2,844,519

HYDROCARBON CONVERSION PROCESS AND APPARATUS EMPLOYING A CONVEYANCE-REGENERATION ZONE

Raoul P. Vaell, Los Angeles, Calif., assignor to Union Oil Company of California, Los Angeles, Calif., a corporation of California Application June 25, 1954, Serial No. 439,380

20 Claims. (Cl. 196—50)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid contact material, such as a granular solid hydrocarbon conversion catalyst, which material is recirculated successively through a contacting or reaction zone and through a solids regeneration or reheating zone. One specific feature of the present invention is an improved method and apparatus for regenerating and reheating solid catalyst or other solid contact material employed in such processes.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 1000° F. and including the light and heavy naphthas or gasolines and the light and heavy gas-oil fractions, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, or diesel or jet engine fuels and the like.

In all of the foregoing processes which utilize a recirculating stream of solid contact material, the usual problems of transporting the solids with minimum energy and without substantial attrition loss in a superatmospheric temperature and pressure system are involved. In some cases separate contacting and regeneration vessels are employed which require them to employ separate conveyance steps to transport the solids from the bottom of each vessel to the top of the other. Sometimes these processes are effected in a single column so that only a single solids transport step is required, the regenerator and reactor being located one above the other in the column. The disadvantage of the former modification is the necessity for two columns and the requirement for two separate solids handling steps. The principal disadvantage of the second modification is primarily structural in that with superimposed reaction and regeneration zones an excessively high mechanical structure is required, sometimes exceeding 200 feet in elevation. A further disadvantage of the single column operation lies in the fact that the conveyance distance is not materially different from the total conveyance distance in the two-column modification.

Conventionally, the granular solids have been conveyed for recirculation by mechanical elevators, by suspension in a conveyance fluid in the well-known gas lift or pneumatic conveyance systems, and the like. Although the mechanical operators operate with quite low energy requirements, they are practically impossible to maintain at operating temperatures of around 1000° F. and at superatmospheric pressure conditions. Although the so-called gas lift type of conveyer readily operates at superatmospheric pressures, tremendous quantities of gas are required in contacting systems recirculating contact material at high solids to fluid ratios. In addition, the fact that the solid particles move at relatively high velocities of the order of 50–100 feet per second and are free to impact the inner conveyer walls and each other are the causes of an excessively high solids or catalyst attrition rate.

The present invention is directed to an improved process and apparatus of such a nature that all of the foregoing conveyance and regeneration problems and disadvantages are simultaneously eliminated in an integrated process for contacting reacting fluids with recirculating solid contact material.

It is a primary object of this invention to provide an improved process for fluid-solids contacting operations in which granular solids are recirculated and simultaneously treated to effect a substantially complete reheating or regeneration during a single conveyance step.

It is an additional object of this invention to provide a simultaneous conveyance-regeneration process for the conveyance and regeneration of spent granular contact material in a solids-fluid contacting process and which operates at high mechanical efficiency, causes substantially no granular solids attrition, and effects a substantially complete solids regeneration or reheating during the conveyance, a result which is impossible in the conventional gas-lift conveyances.

It is a further object of this invention to provide an improved method for removing heat from a conveyance-regeneration zone involving a recycle stream of conveyance-regeneration gas, the recirculation rate of which is reduced to a minimum by a heat exchange step between the entering regeneration-conveyance gas and the granular contact material during the initial stages of its conveyance and regeneration.

It is an additional object of this invention to provide an improved apparatus for accomplishing the foregoing objects.

Other objects and advantages of the present invention will become apparent to those skilled in the art as the description thereof proceeds.

Briefly, the present invention comprises an improved process and apparatus for the continuous contacting of reactive fluids with granular solid contact material in a reaction or conversion zone. The granular material, which may have catalytic properties, is recirculated from the reaction zone upwardly as a substantially compact or dense-packed moving bed of granular solids through a conveyance-regeneration zone and is discharged therefrom in fully regenerated form directly into the top of the reaction zone for reuse.

It is immediately apparent that the double conveyance required in the conventional contacting processes employing separate regeneration and reaction vessels has been avoided and substituted with a single conveyance of less than half the distance heretofore required because the usually required sealing legs of great length used in gas-lift suspension conveyances are eliminated. It is also apparent that the distance for conveyance in this invention is reduced by more than one-half from the distance required in the conventional processes using superimposed reaction and regeneration zones and that accordingly the physical structure of the apparatus of this invention has been substantially reduced with attendant economic savings.

Spent granular solids removed from the bottom of the reaction zone are conveyed upwardly as a dense moving bed through the conveyance-regeneration zone or conduit by employing a series of novel and critical steps. The spent granular solids are introduced into the conveyance-regeneration zone in such a manner that its inlet opening is submerged and surrounded by a dense bed of solids to be conveyed. This is conveniently done by providing an induction zone or chamber into which the solids may be introduced at its upper end and surrounding the inlet opening of the conveyance-regeneration zone at a low point therein so that solids upon introduction cover and submerge the inlet opening. Immediately adjacent the outlet opening of the conveyance-regeneration zone, a means is provided for applying a thrust or compacting force against the moving bed of regenerated and conveyed granular material discharging therefrom. This may be done in several ways including the disposition of a mesh or plate or cap immediately adjacent the outlet opening against which the moving bed of solids flows and then reverses its direction, or by discharging the solids in any direction directly into a chamber against a wall of the chamber or against a bed of previously discharged solids so that the outlet opening is submerged by a bed of such solids as when solids are discharged upwardly or horizontally, or by discharging the solids downwardly into such a chamber to form a conical pile whose apex intersects the outlet opening. The object of this step is to in some way restrict at the outlet opening the discharge of solids therefrom without effecting any substantial restriction on the discharge of conveyance-regeneration fluid at the same point so that the granular material in the conveyance-regeneration line is prevented from becoming fluidized or suspended in the conveyance fluid while it is moved and thus the moving solids are maintained substantially at their static bulk density, that is, at the same bulk density as that of a downwardly moving gravity-packed bed, which in turn is substantially the same as the bulk density of the solids when at rest.

The granular solids in this dense-packed form are caused to move by passing a concurrent flow of conveyance-regeneration fluid upwardly through the conveyance-regeneration zone at a rate sufficient to overcome the opposing forces of gravity acting on the solids and also to overcome opposing forces of friction of conveyance zone walls and the like which act against the solids when they are conveyed. This fluid flows through the serially connected interstices of the dense-packed mass of granular solids which presents a high resistance elongated path for the fluid flow. By maintaining a substantial pressure differential between the inlet and the outlet of the conveyance-regeneration zone, a sufficient quantity of fluid is forced to flow therethrough generating a more or less constant pressure gradient at all points along the length of the conveyance-regeneration zone so as to apply a conveyance force uniformly throughout the zone. The ratio of the resulting conveyance force tending to move the solids to the forces of gravity acting in the opposite direction has been termed the conveyance force ratio and is given by:

$$\frac{\frac{dp}{dl}}{\rho_s \cos \theta} \quad (1)$$

wherein $$\frac{dp}{dl}$$

is the pressure gradient in pounds per square foot per foot, $\rho_s$ is the static bulk density of the granular solids being conveyed in pounds per cubic foot, and $\theta$ is the angular deviation of the direction of conveyance from an upward vertical reference axis. When the conveyance fluid flows at a rate sufficient to generate a pressure gradient which exceeds the forces of gravity expressed by the term ($\rho_s \cos \theta$) in Equation 1, a slightly additional flow of fluid is sufficient to exceed opposing forces of friction and permit the solids to move continuously in dense or compact form as an upwardly moving bed when a bed of solids is continuously supplied at the inlet and dense granular solids are continuously withdrawn at a controlled rate from the discharged mass of solids at the outlet of the conveyance-regeneration zone.

Because of the substantial pressure gradient characteristic of this form of conveyance and because of the fact that there is only a relatively minor pressure differential existing between the inlet and outlet of a solids-fluid contacting vessel, it is apparent that the present conveyance-regeneration system cannot be directly connected at both its outlet and inlet respectively to the solids inlet and outlet of the contacting zone. In the present invention only one of the aforementioned connections is made and the other connection is made indirectly through a granular solids pressuring vessel into which granular solids are charged at a relatively low pressure, the vessel is sealed, high pressure fluid is injected to increase the pressure by an amount approximating the characteristic pressure differential of the conveyance-regeneration zone, and then the solids are discharged at the higher pressure. If the inlet to the conveyance-regeneration zone communicates directly with the outlet of the reaction zone, this pressuring step is employed to receive solids from the outlet of the conveyance-regeneration zone and to pressure them into the top of the reaction zone. When the outlet of the conveyance zone communicates directly with and at substantially the same pressure as the reaction zone, the pressuring zone receives solids at that pressure from the bottom of the reaction zone and pressures them into the inlet of the conveyance-regeneration zone as is illustrated in the accompanying drawing. So far as the present invention is concerned, the pressuring step can be in any part of the cycle, that is, either before or after conveyance-regeneration.

The present invention is particularly well adapted to the handling of granular solid materials in the well-known hydrocarbon conversion processes mentioned above and in which a liquid or vaporized hydrocarbon is contacted directly with a moving mass of contact material, usually having catalytic activity. During such process, the catalyst ordinarily becomes deactivated after a variable period of contact and is contaminated by a hydrocarbonaceous deposit generally referred to as coke. During the regeneration, the coked catalyst is treated with an oxygen-containing regeneration gas whereby the hydrocarbonaceous material is burned from the catalyst and the activity is restored. With most spent hydrocarbon conversion catalysts, the oxygen-containing regeneration gas will not initiate and sustain combustion until the spent catalyst is raised in temperature to about 700° F. Most hydrocarbon conversion catalysts also cannot be heated during regeneration to temperatures much above about 1100° F. and the spent conveyance-regeneration gas is disengaged from the regenerated catalyst at temperatures below this value. These then are the temperature limits within which the conveyance-regeneration zone must operate when handling spent hydrocarbon conversion catalysts.

In the process of this invention, the removal of heat from the conveyance-regeneration zone is effected by maintaining a recycle of conveyance-regeneration gas upwardly through the conveyance-regeneration zone and then through external heat interchange means and back into the inlet of the zone. The conveyance-regeneration gas is disengaged from the regenerated solids and discharged at the top of the unit at temperatures of the order of 1000° F. Ordinarily these gases can only be cooled to a temperature which will initiate combustion of the hydrocarbonaceous spent solids, that is, about 700° F. However, in the present invention a special heat interchange step is effected along at least the first part of the length of the conveyance-regeneration zone itself thereby maintaining low wall temperatures and permitting the regeneration gases to be cooled externally to temperatures considerably below this usual minimum temperature. This permits a substantial decrease in the required diameter of the conveyance-regenerator conduit which improves the heat transfer as well as a decrease in the quantity of conveyance-regeneration gas recycle needed to remove the heat generated in the regeneration system. This is due to the fact that in this specific type of upflow conveyance-regeneration the major portion of the coke burn-off occurs in the lower or first portion of the conveyance-regeneration zone and the minor portion of regeneration occurs in the upper regions of the zone. Accordingly the cooled regeneration gas is preheated indirectly from well below the spent catalyst ignition temperature by passing it in indirect heat exchange relation with the lower part of the conveyance-regeneration zone whereby it is heated to the temperature necessary to initiate combustion and is then introduced into the conveyance-regeneration zone for upward passage therethrough. Employing this technique has permitted reductions in conveyance-regeneration fluid recycle of up to 75% because the recycle gas can herein readily be cooled from 950° F. or higher to as low as 150° or lower (with condensate removal provision) instead of only to the 700° F. figure mentioned above.

The present invention will be more readily understood by reference to the accompanying drawing which is a combination flow diagram of the process of this invention and a detailed drawing of an elevation view in partial cross section of the contacting and regeneration apparatus. The description of the drawing is conducted in terms of a specific example of the present invention as applied to the continuous reforming and desulfurization of a petroleum naphtha in the presence of hydrogen by means of a recirculating stream of cobalt molybdate catalyst to produce a desulfurized and aromatic gasoline blending stock.

The permissible operating conditions for naphtha reforming and desulfurization are from 700–1100° F., from 50 to 2000 p. s. i. g., and from 500 to 10,000 s. c. f. of hydrogen per barrel of naphtha feed. The following example gives the specific operating conditions of one installation.

Referring now more particularly to the drawing, the apparatus consists essentially of catalyst separator and pretreating chamber 10 into which the regenerated catalyst is discharged, naphtha reforming column 12 through which the catalyst passes downwardly as a moving bed by gravity, catalyst pressuring chamber 14 receiving spent catalyst from reforming chamber 12, induction chamber 16 into which the spent pressured catalyst is discharged, and conveyance-regeneration chamber 18 through which the spent catalyst is conveyed and regenerated and discharged for recirculation into separator chamber 10.

The apparatus of this invention as shown in the drawing is for the catalytic reforming and desulfurization of 1100 barrels per stream day of a petroleum naphtha having the following properties:

TABLE I

Naphtha feed

| | |
|---|---|
| Boiling range, °F. | 240–420 |
| A. P. I. gravity | 46.3° |
| Sulfur weight, per cent | 0.578 |
| Nitrogen weight, percent | 0.020 |
| Knock rating (F–1 clear) | 61.8 |
| Naphthenes volume, percent | 42 |
| Aromatics volume, percent | 15 |

This naphtha feed is introduced through line 20 at a rate of 1100 barrels per day controlled by valve 22 and is preheated by exchange with hot regeneration gas recycle in interchanger 184 described subsequently, and then is further heated and vaporized in fired heater 24. The naphtha vapor is introduced through transfer line 26 at a temperature of 900° F. and a pressure of 405 p. s. i. g. into naphtha engaging zone 28 in column 12. A primary stream of recycle gas containing hydrogen is introduced through primary recycle gas engaging zone 30 at a rate of 1700 M s. c. f. per day and at a temperature of 900° F. The mixture of naphtha vapor and hydrogen passes upwardly through primary reforming zone 32 countercurrent to the downflowing bed of cobalt molybdate catalyst. Herein the cyclization of paraffin hydrocarbons takes place to form naphthenes and the endothermic aromatization of the naphthenes hydrocarbons takes place and results in a temperature decrease. To maintain an approximately constant temperature profile throughout reaction column 12, a secondary hydrogen recycle stream is introduced into secondary recycle gas engaging zone 34 at a temperature of 1150° F. and at a rate of 1130 M s. c. f. per day to increase the temperature of the reacting mixture to about 910° F. The thus reheated mixture passes countercurrent to the catalyst through secondary reforming zone 36 wherein a further temperature decrease takes place due to the continuing endothermic aromatization reactions. A tertiary stream of recycle gas at 1150° F. is introduced into tertiary recycle gas engaging zone 38 at a rate of 1290 M s. c. f. per day to raise the reactant mixture temperature again to about 910° F. The mixture then continues upwardly through tertiary reforming zone 40 from which the effluent is removed from disengaging zone 42 at a temperature of about 880° F. and at 400 p. s. i. g. through line 44.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum forming tendencies when employed as internal combustion engine fuels. The cooled and partially condensed effluent then passes through line 48 and is introduced into separator 50 which is preferably a cyclone known as the Webre cyclone. Herein the partial condensate, amounting to a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52, operates coolant bypass valve 60 so that the hot effluent flowing through line 44 is cooled sufficiently to partially condense that desired proportion of the reactor effluent.

The preferred proportion so condensed is a very minor amount ranging from 0.01% up to about 10% by volume. Preferably this proportion is between about 0.1% and about 5%, and in the experimental verification of the present invention it has been found that partial condensation of about 2.2% by volume was sufficient to substantially eliminate the so-called heavy ends or polymer from the effluent so as to avoid the usual necessity for rerunning the depropanized liquid product, which invariably results in some thermal degradation forming additional high boiling polymeric materials.

In the present invention, slightly more than 2% by volume of the effluent is condensed and is removed at a rate of 22 barrels per day by means of line 62. This material contains reformed gasoline boiling above about 420° F. and accordingly is returned for redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described. The condensed effluent together with the uncondensed hydrogen recycle gas flows through line 68 into product separator 70 in which the uncondensed gases are separated from the process product. The reformed naphtha product is removed through line 72 at a rate of 1118 barrels per day controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

TABLE II

*Reformed naphtha product*

| | |
|---|---|
| Boiling range, °F | 94–435 |
| A. P. I. gravity | 51.7 |
| Sulfur weight, percent | 0.004 |
| Nitrogen weight, percent | |
| Knock rating ($F-1+3$ cc. TEL) | 95 |
| Naphthenes volume, percent | 14 |
| Aromatics volume, percent | 40 |

The uncondensed portion of the effluent consists essentially of the hydrogen-containing recycle gas which is removed from separator 70 by means of line 80 and because of the net production of hydrogen in the process, the excess portion of this is bled from the system through line 82 at a rate of 140 M s. c. f. per day controlled by valve 84. Part or all of this gas may be employed as fuel in the fired heaters in the process if desired.

The remaining recycle gas is passed through line 86 and is compressed from 375 p. s. i. g. to 425 p. s. i. g. in recycle gas compressor 88. Part of this compressed recycle gas is passed as a regenerated catalyst pretreating gas through line 100 at a rate of 165 M s. c. f. per day controlled by valve 102 into separator and catalyst pretreating chamber 10. This pretreating gas is introduced below cone-shaped baffle 95 and passes therefrom downwardly through the annular space within the lower periphery of baffle 98 and then directly into the top of the bed of regenerated catalyst in chamber 10. A first part of this gas passes upwardly through sealing leg 99 and pretreating zone 96 countercurrent to the regenerated catalyst. By means of this countercurrent passage of gas the catalyst is pretreated with hydrogen to reduce the higher oxides of cobalt and molybdenum formed during regeneration to the lower oxides. The pretreating gas, along with excess regeneration gas coming down from the top of the lift line, are removed from beneath baffle 94 through line 90 controlled by valve 92. The remaining portion of the pretreating gas introduced through line 100 and passed downwardly into the top of reactor 12, passes radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10. The spent pretreating gas and excess regeneration gas are removed from separator chamber 10 at a point below baffle 94 through line 90 at a rate of 205 M s. c. f. per day controlled by valve 92 which in turn is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 M. s. c. f. per day through line 106 and is preheated in interchanger 108 to 350° F. in exchange with the reactor effluent after polymer removal (interchanger 66).

Of this preheated recycle gas, 3460 M. s. c. f. per day are further heated in fired preheater 110 to a temperature of 1150° F., and 660 M s. c. f. per day passed through bypass line 112 at a rate controlled by valve 114 in response to temperature recorder controller 116. The primary hydrogen recycle gas, introduced into engaging zone 30 at a rate of 1700 M s. c. f. per day and at 900° F., is produced by mixing 1040 M s. c. f. per day of 1150° F. hydrogen flowing through lines 118 and 120 with the 660 M. s. c. f. per day of cooler hydrogen from line 112 and this material is then introduced through line 122 into the primary recycle gas engaging zone 30 at a rate controlled by valve 124 in response to flow recorder controller 126.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 M s. c. f. per day and 1290 M. s. c. f. per day controlled by valves 134 and 136 respectively.

The spent hydrocarbonaceous catalyst passes downwardly through the column 12 at a rate controlled by solids feeder and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by motor valve 150.

The spent solids are thus discharged into pressuring chamber 14 when it is depressured to about 400 p. s. i. g. causing a displacement gas to flow upwardly through outlet 148 into the bottom of reactor 12. A seal gas comprising a mixture of this last-named gas and a small portion of the primary recycle gas stream, which passes downwardly through solids feeder 140, is removed from disengaging zone 151 through line 152 at a rate of 140 M s. c. f. per day controlled by valve 154. This gas is mixed with the spent catalyst pretreating gas removed from the upper part of the column through line 90 and is employed as fuel.

The spent granular solids in pressuring chamber 14 are raised in pressure to 430 p. s. i. g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the conveyance-regeneration chamber. Level indicator 166 is provided to indicate the solids level of bed 162.

Valve 160 is then closed, motor valve 168 is opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140.

Referring now to solids pretreater and separator 10, spent regeneration gases collecting in space 174 are removed therefrom through line 176 at a rate of 1612 M. s. c. f. per day and a temperature of 984° F. This gas is passed into solids separator 178 wherein any catalyst fines elutriated from the catalyst stream in separator 10 are removed from the regeneration gas recycle. These solids are removed from separator 178 by means of line 180. The solids-free recycle gas then flows through line 182 through heat exchanger 184 in exchange with raw naphtha feed referred to above and is therein cooled to a temperature of about 640° F. This temperature is controlled by temperature recorder controller 186 which operates bypass valve 188 so as to control the naphtha coolant passing through interchanger 184. The cooled recycle gas passes through line 190 and is compressed to 430 p. s. i. g. in compressor 192. This recycle gas then flows through line 194 at a rate controlled by valve 196 and is divided into a solids pressuring stream flowing through line 198 to pressure solids in chamber 14, and a regeneration-conveyance stream flowing from line 200.

An oxygen-containing gas, such as air, is introduced via line 202. It is compressed to 433 p. s. i. g. in compressor 204 and is introduced at a rate of 123 M s. c. f. per day controlled by valve 206 in response to oxygen recorder controller 208 for combination with the compressed conveyance-regeneration recycle gas flowing through line 200. The combined oxygen-containing conveyance-regeneration gas, which may contain from about 0.1 to about 10% oxygen and preferably from 0.5 to 5.0% oxygen, then passes at a temperature of about 646° F. and at a rate of 1735 M s. c. f. per day through line 210 tangentially into the upper portion of regenerator heat exchange zone 212. This zone is contained within the annulus between the lower portion of conveyance-regeneration conduit 18 and jacket 214 which surrounds concentrically the lower portion of the conveyance-regeneration conduit. The regeneration gas passes downwardly through zone 212 and is preheated therein by means of the exothermic heat of regeneration liberated within the lower part of conveyance-regeneration zone 18 to a temperature of about 706° F. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst. The regenerated catalyst is discharged against baffle 215 which applies a force against the mass of catalyst issuing from conveyance-regeneration conduit 18 and maintains the upwardly moving catalyst at a bulk density substantially equal to the static bulk density thereof. As stated above, the major part of the coke burn-off from the catalyst occurs in the lower or first part of the conveyance-regeneration zone and a substantial part of this endothermic heat is transferred through the conveyance conduit wall to preheat the conveyance-regeneration gas recycle and to keep the inner conveyance-regeneration conduit wall 217 cool. All of the net endothermic heat of regeneration however is removed as sensible heat in the conveyance-regeneration recycle, with the exception of usual heat losses.

The spent granular catalyst is substantially completely regenerated while passing upwardly through the conveyance-regeneration conduit and is discharged from outlet opening 216 of the conveyance conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited by the height of the conveyer-regenerator or by the velocity of the conveyance-regeneration fluid circulated therethrough, as is the case in the conventional gas-lift or suspended solids systems. Once the conveyance fluid rate is sufficient to exceed the force of gravity and friction on the moving bed, the catalyst will move as continuously fed at the inlet and removed from the outlet. Any necessary increases in conveyance-regeneration fluid rate necessary to remove heat from the system have absolutely no effect whatsoever upon the residence time of the catalyst in the system or the degree to which it is regenerated and the only external effect is one of somewhat increased pressure differential.

Accordingly, in the present process the spent catalyst may be completely regenerated by the removal of the entire quantity of hydrocarbonaceous deactivating materials during conveyance. In the present example, this is accomplished by utilizing an oxygen concentration of about 1.5% at the inlet of the conveyance-regeneration zone. The spent catalyst contains about 4.1% carbon and is discharged into separator 10 after regeneration containing less than about 0.1% carbon and the restoration of activity is essentially 100%.

Because of the novel heat transfer system maintained at the base of the conveyance-regeneration system, very substantial reductions of as much as 75% in the conveyance fluid recycle rate is attained relative to that resulting if the cooling of the gas were limited to a minimum temperature of 750° F., the regenerator inlet temperature needed to maintain spent catalyst combustion because the conveyance fluid recycle stream may be cooled in exchanger 184 to temperatures as low as 150° F. or lower (with provision for condensate removal in separator 191 if necessary) with this particular regenerator.

In the apparatus of this invention, the entire structure above grade level is about 55 feet in height, the reactor column diameter is 4 feet 6 inches, and the conveyance-regeneration conduit is 14-inch schedule 40 pipe. The catalyst is circulated at a rate of 10.3 tons per day and moves at an upward velocity of 15.5 feet per hour through the regeneration-conveyance conduit. This low velocity is totally impossible to maintain in a gas-lift or pneumatic suspension conveyer, and herein it permits the complete regeneration of the catalyst during the lifting step.

Although the present invention has been described in considerable detail above with respect to gasoline or naphtha reforming, it should be understood that the principles of this invention and the advantages accruing therefrom are equally obtainable in any other hydrocarbon conversion process in which a recirculating granular contact material which requires regeneration is employed. It is therefore not intended to limit this invention to gasoline reforming specifically but on the contrary the invention relates to fluid-solids contact processes in general in which an exothermic regeneration of the contact of the recirculating contact occurs. This is true in most, if not all, of the hydrocarbon conversion processes employing contact solids including solid catalysts.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a solids-fluid contacting process wherein a stream of granular solid contact material is recirculated through a fluid contacting zone and then upwardly as a moving bed through a solids regeneration zone, a fluid is passed through said contacting zone in direct contact with said contact material therein, a conveyance-regeneration fluid is passed upwardly through said conveyance-regeneration zone at a rate sufficient to maintain a substantial pressure gradient therein and to convey said material therethrough and to regenerate it, and a force is applied against the regenerated material discharging therefrom to maintain it at a bulk density substantially equal to its static bulk density, the improvement which comprises recirculating said regeneration-conveyance fluid from the outlet of said conveyance-regeneration zone through a cooling zone, cooling said fluid therein to dissipate at least part of the heat of regeneration contained as sensible heat in said fluid, adding additional regeneration fluid to the cooled fluid, passing the cooled fluid through a fluid preheating zone in indirect heat exchange with at least the first part of said conveyance-regeneration zone to absorb heat of regeneration therefrom, and injecting the preheated fluid into the inlet of said conveyance-regeneration zone to convey and regenerate said contact material.

2. In a solids-fluid contacting process wherein a moving bed of granular solid contact material is passed downwardly by gravity through a contacting zone, a fluid is passed therethrough at contacting conditions of temperature, pressure, and composition in direct contact with said moving bed forming spent solids, said spent solids are passed upwardly as a moving bed through a solids regeneration zone concurrently with a regeneration fluid at regeneration conditions of temperature, pressure, and composition and at a rate sufficient to generate a substantial pressure gradient therein to convey said bed of solids, said upwardly moving bed is maintained at substantially the solids' static bulk density by applying a force to the bed of regenerated solids issuing from said conveyance-regeneration zone, and said solids are returned for repassage through said contacting zone, the improvement in removing the heat generated during the regeneration of said solids which comprises disengaging hot regeneration fluid from the regenerated solids, cooling said fluid to a temperature below that at which it was disengaged from the solids after solids regeneration, injecting fresh regeneration fluid into the cooled fluid, preheating the fluid mixture thus formed by passing it in indirect heat exchange relation with at least a portion of said conveyance-regeneration zone adjacent its inlet thereby raising its temperature to a value sufficient to initiate solids regeneration, and injecting the thus preheated fluid mixture into said conveyance-regeneration zone to convey and regenerate said upwardly moving bed of solids thereby maintaining a recirculating stream of conveyance-regeneration fluid.

3. A process according to claim 2 wherein the pressure of fluids present in the interstices of said granular solid contact material is increased in a solids pressuring zone at a point where said contacting zone communicates with said conveyance-regeneration zone and by an amount substantially equal to the pressure differential maintained between the inlet and the outlet of said conveyance-regeneration zone.

4. A process according to claim 2 wherein the said cooled conveyance fluid is compressed to increase its pressure by an amount substantially equal to the pressure differential maintained between the inlet and the outlet of said conveyance-regeneration zone.

5. A process according to claim 2 wherein said contacting zone is a hydrocarbon conversion zone, said fluid passed therethrough is a hydrocarbon stream, said spent solids contain a hydrocarbonaceous deposit, said conveyance-regeneration fluid is a gas containing oxygen, and said temperature necessary to initate regeneration is about 700° F.

6. A process according to claim 5 wherein said solids comprise a hydrocarbon conversion catalyst, the hot conveyance-regeneration gas is disengaged from the conveyed and regenerated catalyst at a temperature below about 1100° F., is cooled to a temperature substantially below about 700° F., and is then preheated to a temperature of a least about 700° F. by indirect heat exchange with said conveyance-regeneration zone.

7. In a hydrocarbon conversion process wherein a moving bed of solid granular hydrocarbon conversion catalyst is passed downwardly by gravity through a hydrocarbon conversion zone, a hydrocarbon is passed therethrough at hydrocarbon conversion conditions of temperature, pressure, and composition in direct contact with said catalyst to form converted hydrocarbons and spent catalyst solids deactivated by a hydrocarbonaceous deposit, and said spent catalyst is passed upwardly as a moving bed through a catalyst conveyance-regeneration zone concurrently with an oxygen-containing conveyance-regeneration gas at catalyst regeneration conditions of temperature, pressure, and composition at a rate sufficient to generate a substantial pressure gradient therein to convey said bed of catalyst, a force is applied against the regenerated catalyst discharging therefrom to maintain said upwardly moving bed substantially at the catalyst's static bulk density, and said regenerated catalyst is returned for repassage through said hydrocarbon conversion zone, the improvement in the conveyance-regeneration which comprises disengaging hot spent regeneration gas from the regenerated catalyst, cooling said spent regeneration gas to a temperature substantially below that necessary to initiate regeneration of said spent hydrocarbonaceous catalyst, adding fresh regeneration gas containing oxygen to the cooled regeneration gas, passing the mixture thus formed in indircet heat exchange relation with said conveyance-regeneration zone to cool the wall thereof and heat said regeneration gas mixture to a temperature sufficient to initiate spent catalyst regeneration, and introducing the thus preheated gas directly into said conveyance-regeneration zone.

8. A process according to claim 7 wherein said hydrocarbon conversion is a reforming reaction, said catalyst is cobalt molybdate, said hydrocarbon is a petroleum naphtha, said gas introduced into said conveyance-regeneration zone comprises flue gas containing between about 0.1% and about 10% of oxygen, said conversion conditions of temperature, pressure, and composition are, respectively, 700° F. to 1100° F., 50 p. s. i. g. to 2000 p. s. i. g., and 500 to 10,000 s. c. f. of hydrogen per barrel of naphtha, and said temperature to initiate spent catalyst regeneration is about 700° F.

9. In a process for the conversion of hydrocarbon wherein a moving bed of solid granular hydrocarbon conversion catalyst is passed downwardly by gravity through a hydrocarbon conversion zone, hydrocarbon conversion conditions of temperature, pressure, and composition are maintained therein while a hydrocarbon is passed through contact with said catalyst forming a spent hydrocarbonaceous catalyst, said spent catalyst is pressured in a solids pressuring zone to a substantially higher pressure, the pressured solids are then passed into an induction zone to maintain a moving bed of spent catalyst therein submerging the inlet opening of an elongated conveyance-regeneration zone and the outlet of a conveyance-regeneration gas preheating zone, said spent catalyst is conveyed to the top of said conversion zone and simultaneously regenerated by passing upwardly as a moving bed through said conveyance-regeneration zone concurrently with a flow of an oxygen-containing conveyance-regeneration gas, and said catalyst is maintained substantially at its static bulk density in said upwardly moving bed by applying a force against the mass of regenerated catalyst discharging from said conveyance-regeneration zone, the improvement which comprises maintaining a recirculation of said conveyance-regeneration gas upwardly through said conveyance-regeneration zone to convey and regenerate said spent catalyst and to absorb as sensible heat the heat liberated during regeneration by the steps of disengaging hot spent conveyance-regeneration gas from the bed of conveyed and regenerated catalyst, passing said gas through a cooling zone to recover the heat of regeneration thereby cooling said gas to a temperature substantially below about 700° F., separating any condensate formed during the cooling step, compressing the cooled gas to a pressure substantially equal to that of said hydrocarbon conversion zone plus the pressure differential maintained between the inlet and the outlet of said conveyance-regeneration zone, adding sufficient oxygen-containing gas to the compressed gas to provide a conveyance-regeneration gas containing between about 0.5% and 5.0% of oxygen, passing said conveyance-regeneration gas through said preheating zone in indirect heat exchange relation with the lower part of said conveyance-regeneration zone to cool the wall thereof and preheat said gas to a temperature of at least 700° F., and discharging the preheated gas directly from the outlet of said preheating zone into the bed of spent pressured catalyst submerging said outlet and the inlet of said conveyance-regeneration zone in said induction zone whereby said gas flows into said inlet and flows upwardly through said conveyance-regeneration zone.

10. A process according to claim 9 in combination with step of passing a part of said cooled compressed gas into said pressuring zone to raise the pressure of gases in the interstices of the spent catalyst therein from a pressure substantially equal to that in said conversion zone by an amount substantially equal to the pressure differential existing between the inlet and the outlet of said conveyance-regeneration zone.

11. A process according to claim 9 wherein said spent conveyance-regeneration gas is cooled in said cooling zone to a temperature below the dew point thereof in combination with the step of separating a condensate therefrom prior to compressing said gas.

12. A process for the regeneration of spent granular solid contact material and removing the heat liberated during the regeneration which comprises passing the spent solids into the inlet of an elongated conveyance-regeneration zone, passing a conveyance-regeneration fluid into said inlet and concurrently through said conveyance regeneration zone at a rate sufficient to generate a substantial pressure differential between the inlet and the outlet thereof to convey said solids upwardly therethrough, applying a force against the regenerated solids discharging therefrom to maintain said solids therein substantially at their static bulk density, disengaging hot spent conveyance-regeneration fluid from said regenerated solids, cooling said hot fluid to a temperature substantially below that necessary to initiate regeneration, mixing fresh regeneration fluid with the cooled fluid to form said conveyance-regeneration fluid, passing the last-named fluid through a preheating zone in indirect heat exchange relation with at least the first part of said conveyance-regeneration zone to cool the walls thereof and heat said fluid at least to the temperature necessary to initiate combustion, and injecting the heated fluid into said conveyance-regeneration zone to maintain a fluid recycle therethrough and regenerate said spent solid material.

13. A process according to claim 12 wherein said spent solid contact material contains a hydrocarbonaceous deposit, said conveyance-regeneration fluid comprises flue gas to which an oxygen-containing gas is added, and the temperature necessary to initiate regeneration is about 700° F.

14. In an apparatus for contacting a fluid with a recirculating stream of granular solid contact material including at successively lower levels a solids-receiving and fluid disengaging chamber, a contacting column, a solids pressuring chamber, and a solids induction chamber, and an elongated conveyance-regeneration conduit communicating at its inlet with a low point in said induction chamber whereby said inlet is submerged in compact solids present therein, said conveyance-regeneration conduit also communicating at its outlet with said solids-receiving and fluid disengaging chamber, means adjacent said outlet to apply a force against solids discharging therefrom to maintain them in said conduit substantially at their static bulk density, means for passing a fluid through said contacting column, a fluid outlet for disengaged fluid from said fluid disengaging chamber, and fluid conduit means communicating with said solids pressuring chamber for the introduction and removal of fluids, the improvement which comprises a conveyance-regeneration fluid preheating chamber surrounding at least the part of said conveyance-regeneration conduit nearest its inlet opening and having an outlet opening adjacent said inlet opening of said conveyance-regeneration chamber, a cooling means communicating in fluid-receiving relation with said fluid outlet from said fluid disengaging chamber, and means for passing fluid from said cooling means into the inlet of said preheating chamber.

15. An apparatus according to claim 14 wherein said preheating chamber coaxially forms with said conveyance-regeneration conduit an elongated annular space therebetween, and said inlet into said preheating chamber opens tangentially thereinto.

16. In an apparatus for the treatment of a fluid stream through contact with a moving bed of solid granular contact material which comprises a contacting apparatus structure adapted to confine said downwardly moving bed and provided at successively lower levels with a solids-receiving and fluid-disengaging chamber, a fluid-solids contacting chamber, a solids pressuring chamber, and an induction chamber, an elongated conveyance-regeneration conduit communicating at its inlet opening with a low point in said induction chamber whereby said inlet is submerged in compact solids present therein, said conveyance-regeneration conduit also communicating at its outlet opening with said solids-receiving and fluid disengaging chamber, and a means at said outlet opening adapted to apply a force against the mass of contact material discharging therefrom to maintain the solids moving in said conveyance-regeneration conduit substantially at their static bulk density, the improvement which comprises an elongated pre-heating chamber coaxially disposed around at least the lower part of said conveyance-regeneration conduit and forming therebetween an annular space, said chamber being closed at its upper end by integral attachment to said conveyance-regeneration conduit and having a lower annular opening surrounding said inlet opening of said conveyance-regeneration conduit, a fluid outlet opening from said solids-receiving and fluid-disengaging chamber, a fluid cooling means communicating with said fluid outlet, a fluid compressing means communicating at its inlet with said cooling means, conduit means for introducing a first part of the compressed fluid from said compressing means into said pressuring chamber, conduit means for introducing a second part of said fluid from said compressing means through an inlet opening tangentially into said elongated annular space within said preheating chamber at a point adjacent the closed end thereof whereby said fluid is preheated therein and then introduced into said conveyance-regeneration conduit, and means for mixing fresh regeneration fluid with said second part of said compressed fluid.

17. An apparatus according to claim 16 in combination with a liquid-gas separator means disposed between said fluid cooling and compressing means adapted to separate condensate from cooled fluid leaving said cooling means.

18. An apparatus according to claim 16 wherein said induction chamber comprises an inclined cylindrical pressure resistant vessel having a solids inlet at its higher end opening from said solids pressuring chamber, and said annular outlet opening from said preheating chamber and said inlet opening to said conveyance-repenerator chamber are disposed within said induction vessel and adjacent its lower end.

19. An apparatus for the conveyance-regeneration of spent granular solid contact material which comprises an elongated conveyance-regeneration conduit, means for maintaining an accumulation of spent solids submerging the inlet opening thereof, means for introducing a conveyance-regeneration fluid thereinto so as to flow therethrough at a rate sufficient to convey said solids, means adjacent the outlet opening thereof to apply a force against the mass of regenerated solids issuing therefrom to maintain said solids at their static bulk density in said conveyance-regeneration conduit, means for disengaging hot spent conveyance-regeneration fluid from said mass of regenerated solids, a fluid preheating chamber surrounding at least part of said conveyance-regeneration conduit adjacent its inlet end and having its outlet opening disposed immediately adjacent the inlet opening of said conveyance-regeneration conduit, a fluid cooling means in fluid-receiving relation with the fluid disengaging means, and means for passing the cooled fluid from said cooling means into the inlet of said preheating chamber to pass said fluid therethrough in indirect heat exchange with said conveyance-regeneration conduit.

20. An apparatus according to claim 19 in combination with means for mixing fresh regeneration fluid with said cooled spent conveyance-regeneration fluid prior to introduction into said conveyance-regeneration conduit.

References Cited in the file of this patent

UNITED STATES PATENTS

| | | |
|---|---|---|
| 2,335,610 | Plummer | Nov. 30, 1943 |
| 2,377,513 | Page | June 5, 1945 |
| 2,379,408 | Arveson | July 3, 1945 |
| 2,489,863 | Collins et al. | Nov. 29, 1949 |
| 2,534,025 | Howes et al. | Dec. 12, 1950 |
| 2,684,124 | Hines | July 20, 1954 |
| 2,684,872 | Berg | July 27, 1954 |
| 2,696,461 | Howard | Dec. 7, 1954 |
| 2,711,386 | Delaplaine | June 21, 1955 |